US006450618B2

(12) United States Patent
Kato et al.

(10) Patent No.: US 6,450,618 B2
(45) Date of Patent: *Sep. 17, 2002

(54) INK JET HEAD AND METHOD OF PRODUCING THE SAME

(75) Inventors: Seiichi Kato; Yukito Sato; Masayoshi Esashi, all of Miyagi (JP)

(73) Assignee: Ricoh Company, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,638

(22) Filed: Jul. 10, 1998

(30) Foreign Application Priority Data

Jul. 22, 1997 (JP) ..................................... 9-196070

(51) Int. Cl.[7] ......................... B41J 2/04; B21D 53/76; G01D 15/00

(52) U.S. Cl. ......................... 347/54; 29/890.1; 216/27

(58) Field of Search ......................... 347/54, 68–71; 216/27; 29/890.1; 438/21

(56) References Cited

U.S. PATENT DOCUMENTS 4,872,945 A * 10/1989 Myers et al. ............... 156/627
5,513,431 A * 5/1996 Ohno et al. .................... 347/54

FOREIGN PATENT DOCUMENTS

JP 6-23986 2/1994

* cited by examiner

*Primary Examiner*—John Barlow
*Assistant Examiner*—An H. Do
(74) *Attorney, Agent, or Firm*—Cooper & Dunham LLP

(57) ABSTRACT

An ink jet head and a method of producing the same are disclosed. Use is made of a sufficiently thick single crystal at the time of anodic bonding, so that a vibration plate is free from deformation without resorting to any special short-circuit electrode.

4 Claims, 5 Drawing Sheets

INK JET HEAD AND METHOD OF PRODUCING THE SAME

BACKGROUND OF THE INVENTION

The present invention relates to an ink jet head and a method of producing the same and, more particularly, to a head for an on-demand ink jet printer and a method of producing the same.

Today, an on-demand ink jet printer is extensively used because it features high image quality for its cost. However, the problem with an on-demand ink jet printer is that it is lower in printing speed than, e.g., a laser printer. Some different approaches have been proposed to implement high density for enhancing high speed printing with an on-demand ink jet printer. Japanese Patent Laid-Open Publication No. 6-23986, for example, uses a single crystal Si (100) substrate for a first Si substrate and subjects it to anisotropic etching while matching the short side or width of a vibration plate to the dimension of a mask opening. Specifically, after the first Si substrate has been formed with gaps which will turn out liquid chambers, the substrate is bonded to a second Si substrate. Then, the second substrate is etched and ground in order to form vibration plates. Subsequently, the laminate is bonded to a glass substrate formed with gaps and counter electrode by anodic bonding. when the Si substrate having a thickness of 3 $\mu$m and the glass substrate formed with the gaps having a depth of about 1 $\mu$m are bonded by anodic bonding, a voltage of several hundred volts is applied to the gaps and causes the vibration plate to deform.

Because the above deformation of the vibration remains, it is necessary to short-circuit the vibration plates and associates counter electrodes during anodic bonding.

However, it is extremely troublesome to short-circuit all of more than 100 vibration plates included in a single chip;

moreover, a single wafer includes about 100 chips. In addition, chips located at the central portion of a wafer cannot be easily short-circuited. Further, because electrochemical etching follows the bonding of the first and second Si substrates, the substrate with the gaps for implementing ink chambers must be protected by special processing during etching. For example, it is necessary to form a thick thermal oxide film in order to etch out only a portion corresponding to the bonding surface, or to apply a thick organic resist for obstructing etching.

SUMMARY OF THE INVENTION

It is therefore an object of the present invention to provide an ink jet head using a sufficiently thick single crystal at the time of anodic bonding and thereby obviating the deformation of a vibration plate without resorting to any special short-circuit electrode, and a method of producing the same.

An ink jet head of the present invention includes a substrate, a plurality of nozzles, a plurality of ink passageways each being communicated to the respective nozzle, a vibration plate positioned in a part of each of the ink passageways, a plurality of independent electrodes formed on the substrate and facing the vibration plate, and a common electrode formed on the vibration plate. A drive voltage is applied between the common electrode and any one of the independent electrodes for causing the vibration plate to electrostatically deform, thereby ejecting a drop of ink from one of the nozzles associated with the above independent electrode. The vibration plate is implemented by single crystal Si while the substrate is implemented by glass having a coefficient of linear expansion close to that of the single crystal Si at temperatures between 200° C. and 400° C. After the single crystal Si has been bonded to the substrate by anodic bonding, the single crystal Si is thinned to a preselected thickness by etching or grinding, and then an ink passageway, ink chamber and nozzle section is adhered or bonded to the substrate.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
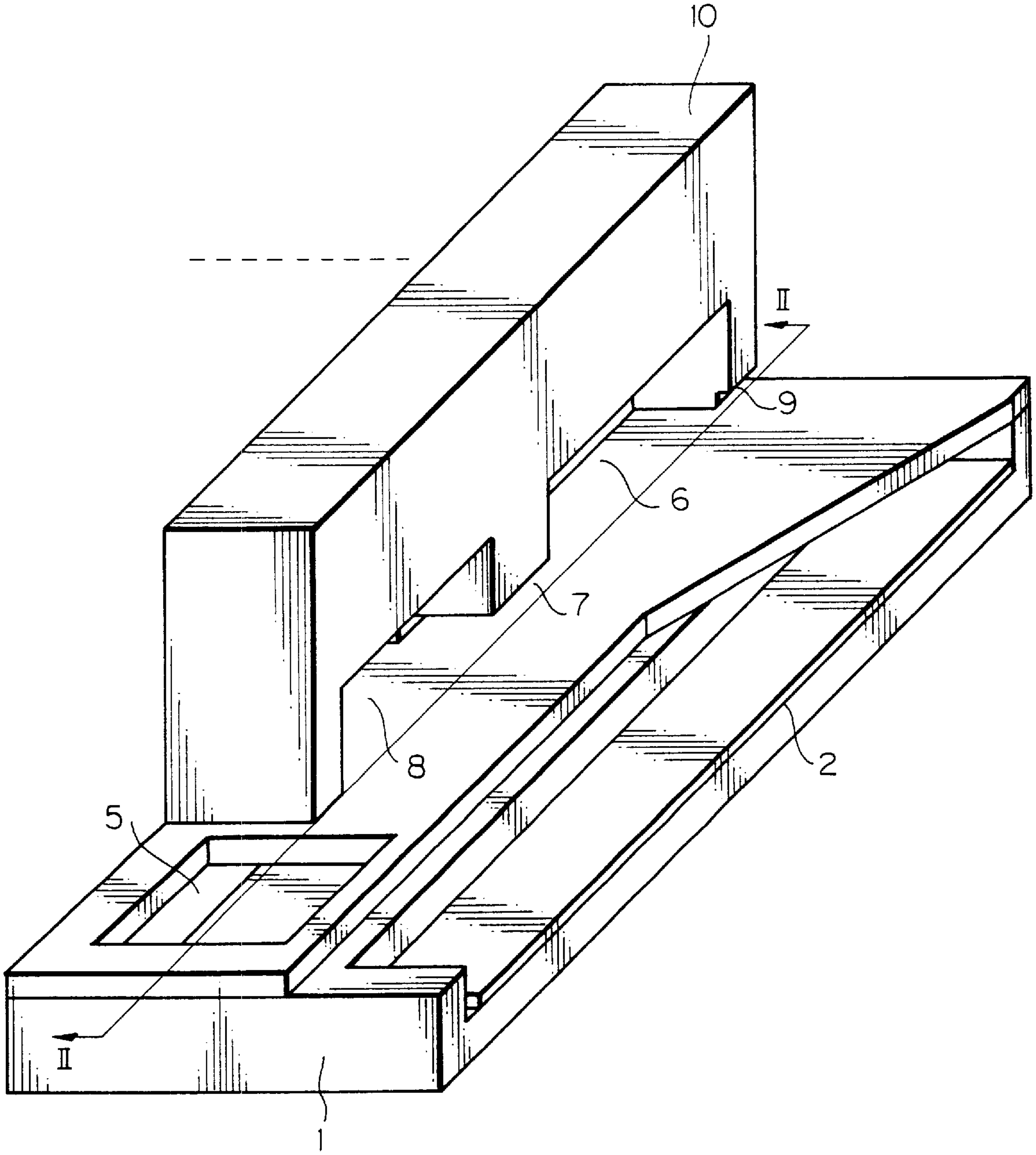
FIG. 1 is a perspective view showing an electrostatic ink jet head embodying the present invention.
Figure 2:
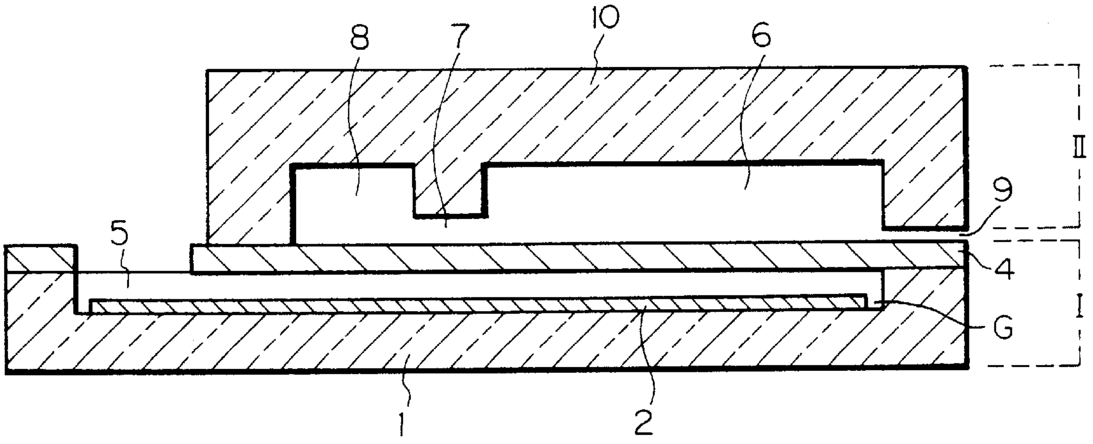
FIG. 2 is a section along line II—II of FIG. 1.
Figure 3:
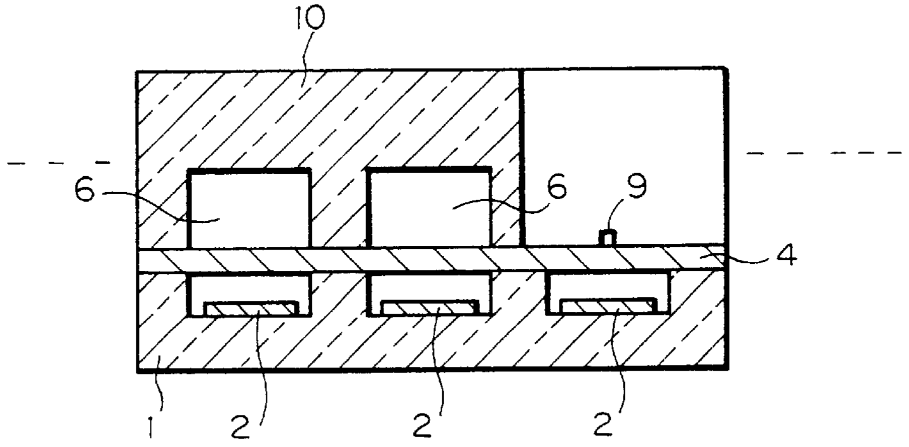
FIG. 3 is a section showing ink compression chambers included in the head of FIG. 1.
Figure 4:
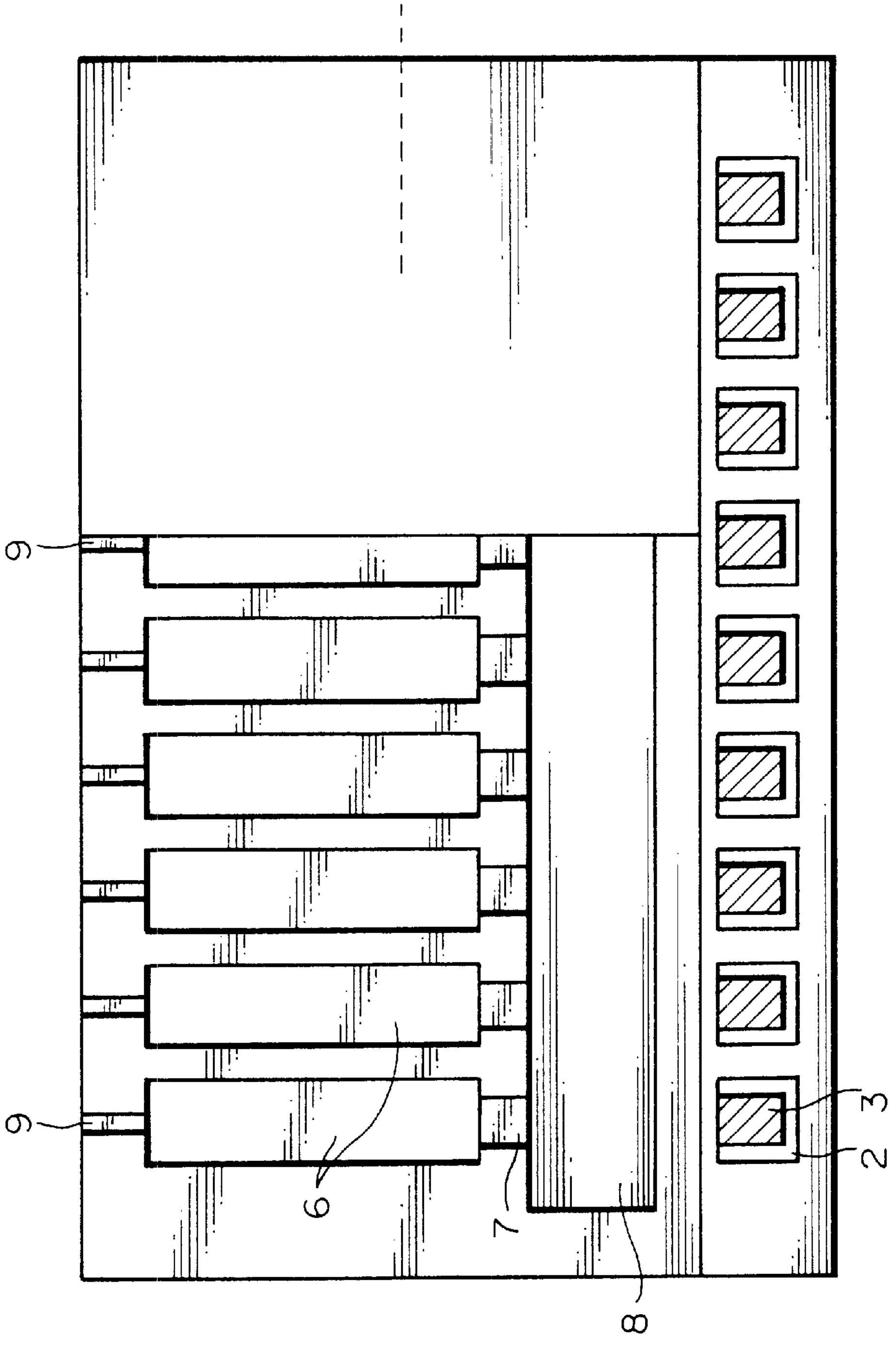
FIG. 4 is a partly taken away plan view of the head shown in FIG. 1.

Briefly, in accordance with the present invention, a glass substrate is formed with gaps and counter electrodes or independent electrodes and then bonded to an Si wafer with the thickness of a commercially available wafer by anodic bonding. Because the Si wafer is 150 $\mu$m to several hundred microns thick, it is free from deformation despite a voltage of several hundred volts applied for anodic bonding. In addition, the glass substrate is different in substance from the Si wafer, so that no protection is necessary during electrochemical etching following the above bonding.

Referring to FIGS. 1–4, an electrostatic ink jet head embodying the present invention is shown. As shown, the ink jet head includes a glass substrate 1, counter electrodes or independent electrodes 2, common electrodes 3, a vibration plate 4, an opening 5 for wiring, ink compression chambers 6, ink passageways 7, a common ink chamber 8, nozzles 9, and glass partitions 10. The electrostatically driven vibration plate 4 and the substrate 1 including the counter electrodes 2 will be referred to as an actuator section I hereinafter. Also, the section including the ink compression chambers 6 for ejecting ink, the common ink chamber 8 for feeding ink to the independent chambers 6, the passageways 7 providing communication between the common chamber 8 and the independent chambers 6 and the partitions 10, but except for the actuator section I, will be referred to as an ink chamber section II. While the illustrative embodiment lays leads from the counter electrodes 2 below the common ink chamber 8, the leads may be laid above the chamber 8, depending on the design.

A basic procedure for producing the above ink jet head is as follows. After the glass substrate 1 has been formed with gaps G, the counter electrodes 2 each is formed in the respective gap G. A single crystal Si substrate with a thickness of a wafer is bonded to the glass substrate 11 by anodic bonding and then etched and ground in order to form the vibration plate 4 having a preselected thickness, thereby completing the actuator section I. Subsequently, a glass is formed with the ink compression chambers 6, common ink chamber 8 and passageways 7 communicating them, implementing the ink chamber section II. The ink chamber section II is bonded to the actuator section I by anodic bonding. In the illustrative embodiments, the nozzles 9 are arranged in a density of 180 dpi (dots per inch) while the vibration plate 4 is 100 $\mu$m wide and 1.5 mm long.

A sequence of steps for producing the actuator section I will be described more specifically with reference to FIGS. 5A–5G.

Figure 5A:
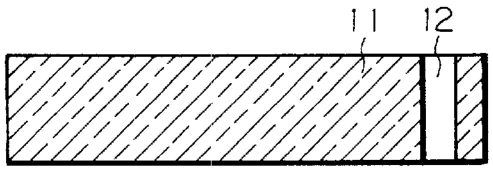
FIGS. 5A–5G are sections demonstrating a sequence of steps for producing an actuator section included in the illustrative embodiment.

(a) First, as shown in FIG. 5A, a through hole 12 is formed in a glass substrate 11 by an ultrasonic processing machine.

Figure 5B:
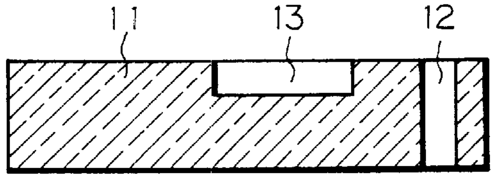

(b) As shown in FIG. 5B, an Ni or Cr thin film is formed on the glass substrate 11 by vapor evaporation. Then, an organic resist is patterned by photolithography and etched by BHF (buffer hydrofluoric acid) in order to form an about 1.0 $\mu$m thick gap 13.

Figure 5C:
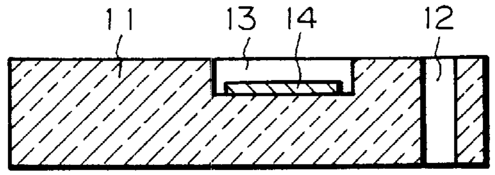

(c) As shown in FIG. 5C, an organic resist is patterned in the gap 13, and then a Ti/Pt laminate thin film to play the role of an electrode is formed on the resist by vacuum evaporation. After the organic resist has been removed, a counter electrode 14 is formed by patterning using a lift-off method. When an insulation film for protection is to be formed on the counter electrode 14, there may alternatively be used the steps of forming a Pt thin film, forming An SiO2 or boric acid glass thin film by sputtering, and then effecting lift-off.

Figure 5D:
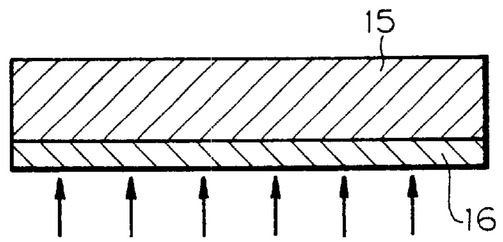

(d) As shown in FIG. 5D, an impurity layer 16 is formed on a (100) Si substrate 15 by the ion implantation, diffusion or epitaxial growth of impurity boron, P or As. The impurity layer 16 has a depth of, e.g., 1.5 $\mu$m to 5 $\mu$m corresponding to the thickness of a vibration plate and forms a p-n junction. If P, As or similar impurity is of n type, then use will be made of a p type substrate. If use is made of B or similar p type impurity, then an n type substrate will be used.

Figure 5E:
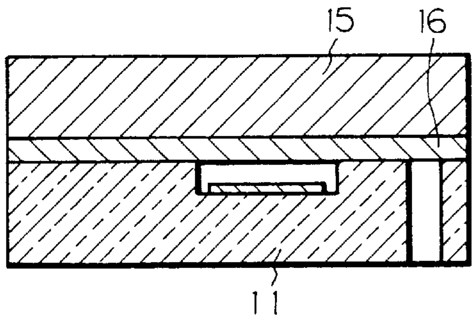

(e) As shown in FIG. 5E, the surface of the Si substrate 15 where the impurity layer 15 is present is brought into contact with the glass substrate 11. Wiring is made such that a needles electrode associated with the glass substrate 11 has negative polarity while a base electrode loaded with the Si substrate 15 has positive polarity. At this instant, the laminate is heated to 400° C. in the atmospheric air or in an Ar, $N_2$, He or similar inactive gas, and 800 V is applied to the electrode with the above polarity. As a result, the glass substrate 11 and Si substrate 15 are bonded together by anodic bonding. Anodic bonding effected at the atmospheric pressure was found to free the vibration plate from deformation, by contrast to vacuum applied to a thin single crystal Si substrate.

Figure 5F:
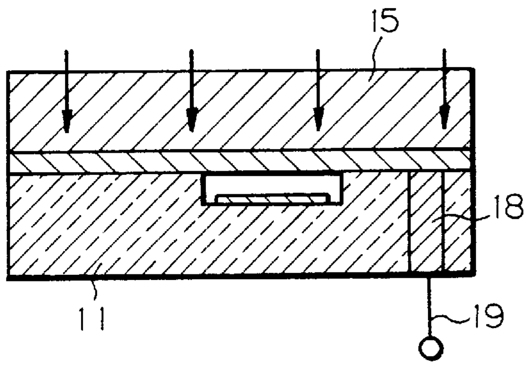

(f) As shown in FIG. 5F, the above laminate is etched by electrochemical etching. A particular electrochemical etching method is applied to each conductivity type of impurity layer, as follows. When the impurity layer is of n type, an Au electrode 18 capable of making resistive contact with the n conductivity type of the Si substrate 15 via the through hole 12 is formed by metal masking and vacuum evaporation. Then, the laminate is sintered at 400° C. Subsequently, after an Au electrode wiring 19 has been bonded, the laminate is immersed in a 80° C. aqueous solution of KOH with the electrode 18 and Pt electrode being respectively provided with positive polarity and negative polarity. It was experimentally determined that a voltage of about 1.0 V caused the etching of the n type layer to stop, but caused the p type layer to be fully etched out, leaving only the n type layer. On the other hand, when the impurity layer is of p type, only a p type layer can be left because the etching rate of a p type layer is extremely low if the B concentration is as high as about IE20, as well known in the art. For experiments, an etchant was implemented by an aqueous solution of ethylenediamine and pyrocatechol.

The vibration plate may alternatively be formed by use of an SOI wafer. Specifically, an SOI wafer produced by laminating single crystal Si wafers via an oxide film and grinding one of them to a thickness of about several microns has customarily been used with a semiconductor device. After the SOI wafer has been bonded to the glass substrate formed with the counter electrode by anodic bonding, as in the previous step (e), the wafer is etched by use of KOH, TMAH or hydrazine with the oxide film serving as a stop layer.

Figure 5G:
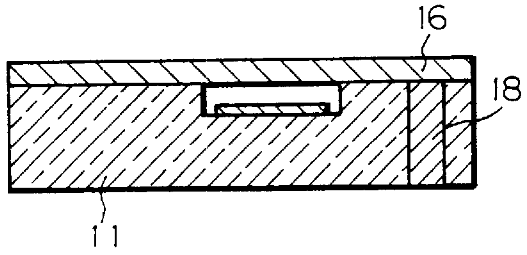

(g) As shown in FIG. 5G, the organic photoresist is opened only above an electrode pad by photolithography, and then single crystal Si is removed by reactive ion etching. As a result, a single crystal Si thin film is formed on the glass substrate 11, completing the actuator section I.

Reference will be made to FIGS. 6A–6G for describing a specific procedure for producing the ink chamber section II.

Figure 6A:
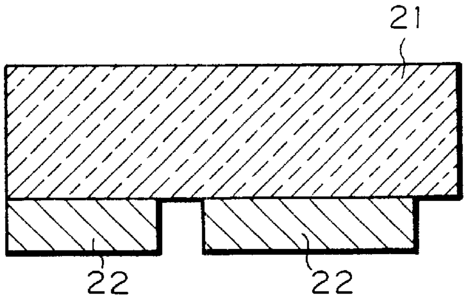
FIGS. 6A–6G are sections demonstrating a sequence of steps for producing an ink chamber section also included in the illustrative embodiment.

(a) As shown in FIG. 6A, a substrate 21 has a coefficient of linear expansion close to that of single crystal Si at temperatures between 200° C. and 400° C. To form the passageways 23 and nozzles 24 in the substrate 21, an organic resist pattern 22 is formed on the substrate 21 by photolithography. The pattern 22 is etched by 30 $\mu$m by a narrow gap, reactive ion etching (RIE) device using a CHF3 and CF4 mixture gas.

Figure 6D:
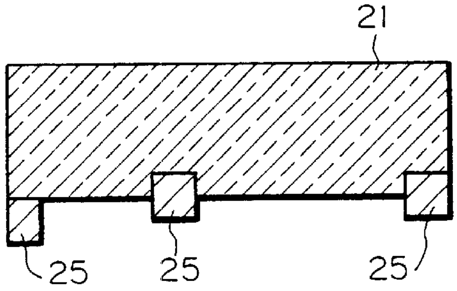
Figure 6B:
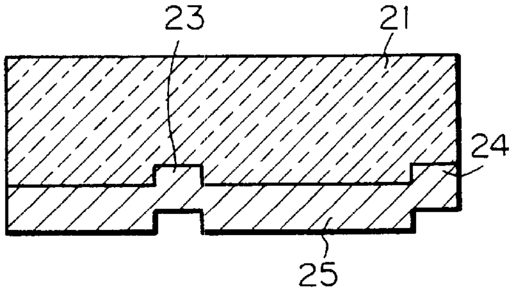

(b) As shown in FIG. 6B, after an Ni film has been formed by vacuum evaporation, a 10 $\mu$m thick Ni film 25 is formed by Ni electrolytic plating using a sulfamine acid bath.

Figure 6E:
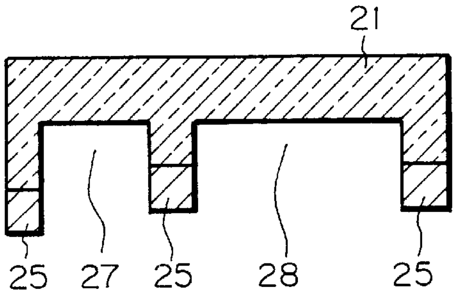
Figure 6C:
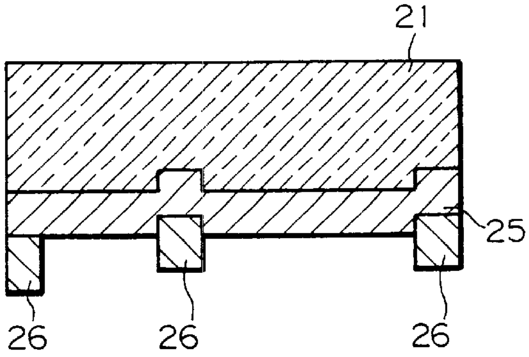

(c) As shown in FIG. 6C, an ink compression chamber and common ink chamber pattern 26 is formed by photolithography effected with an organic resist.

(d) As shown in FIG. 6D, the above laminate is etched in a nitric acid, acetic acid and acetone mixture with a mixture ratio of 1:1:1. As a result, an Ni mask 25 is formed on the glass substrate 21.

(e) As shown in FIG. 6E, the substrate 21 is etched by 100 $\mu$m by a narrow gap, RIE device using a CHF3 and CF4 mixture gas, thereby forming the common ink chamber 27 and compression chambers 28.

Figure 6F:
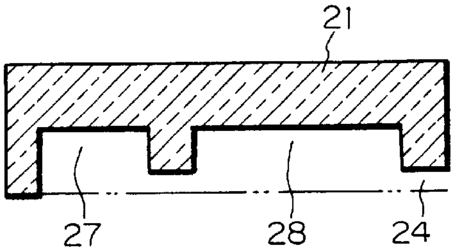

(f) As shown in FIG. 6F, the Ni mask 25 is removed by an etchant.

Figure 6G:
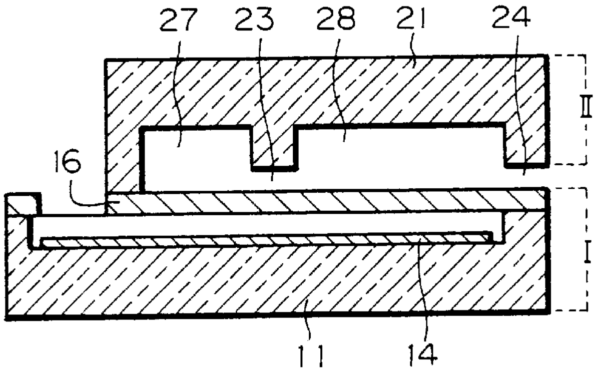

(g) As shown in FIG. 6G, the ink chamber section II is bonded to the actuator section I by anodic bonding, completing the ink jet head having closed ink chambers.

The ink jet head produced by the above sequence of steps was mounted to a unit and then driven by pulses having a voltage of 120 V and a frequency of 10 kHz. The head was found to print attractive images.

In summary, it will be seen that the present invention provides an ink jet head and a method of producing the same capable of preventing a vibration plate from deforming at the time of anodic bonding without resorting to any special short-circuit electrode, because a single crystal is sufficiently thick. The deformation of the vibration plate is also obviated because anodic bonding is effected at the atmospheric pressure. Specifically, because the atmosphere for anodic bonding is sealed in a gap, anodic bonding effected in vacuum evacuates the gap. By contrast, because electrochemical etching effected in the atmospheric air, the vibration plate is free from deformation. Moreover, because all the ink passageways of an ink chamber section except for the vibration plate are implemented by glass, ink chambers have walls hard enough to implement anodic bonding and enhance reliability.

Various modifications will become possible for those skilled in the art after receiving the teachings of the present disclosure without departing from the scope thereof.

What is claimed is:

1. A method of forming an ink jet head including;

a subserate;

a plurality of nozzles;

a plurality of ink passageways each being communicated to a respective one of said plurality of nozzles, a vibration plate positioned in a part of each of said plurality of ink passageways, a plurality of independent electrodes formed on said substrate and facing said vibration plate, and a common electrode formed on said vibration plate, wherein a drive voltage is applied between said common electrode and any one of said plurality of independent electrodes for causing said vibration plate to electrostatically deform, thereby ejecting a drop of ink from one of said plurality of nozzles associated with the one independent electrode, wherein said vibration plate comprises single crystal Si while said substrate comprises glass having a coefficient on linear expansion close to a coefficient of linear expansion of said single crystal Si at temperature between 200° C. and 400° C., said method comprising:

prior to thinning a single crystal Si plate, bonding the single crystal Si plate to said substrate by anodic bonding, said single crystal Si plate having a thickness sufficient to prevent it from deforming during anodic bonding;

after said single crystal Si plate has been bonded to said substrate by anodic bonding, thinning said single crystal Si plate to a preselected thickness by etching or grinding to form said vibration plate; and adhering or bonding an ink passageway, ink chamber and nozzle section to said substrate.

2. A method of forming an ink jet head as claimed in claim 1, wherein the single crystal Si plate and said substrate are subjected to anodic bonding at atmospheric pressure.

3. A method of forming an ink jet head as claimed in claim 1, wherein all of said ink passageways except for said vibration plate are formed by use of glass.

4. A method of forming an ink jet head, said method comprising:

prior to thinning a single crystal Si plate, bonding the single crystal Si plate to a substrate by anodic bonding, said single crystal Si plate having a thickness sufficient to prevent it from deforming during anodic bonding;

after said single crystal Si plate has been bonded to said substrate by anodic bonding, thinning said single crystal Si plate to a preselected thickness by etching or grinding to form a vibration plate; and adhering or bonding at least one of an ink passageway, ink chamber and nozzle section to said substrate.

* * * * *